(12) United States Patent
Yoda et al.

(10) Patent No.: US 6,478,502 B1
(45) Date of Patent: Nov. 12, 2002

(54) STRUCTURE FOR ATTACHING LINK FOR OPENING-CLOSING MEMBER

(75) Inventors: Yutaka Yoda, Saitama (JP); Takeki Tanaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 120 days.

(21) Appl. No.: 09/654,526

(22) Filed: Sep. 1, 2000

(30) Foreign Application Priority Data

Sep. 2, 1999 (JP) ............................................ 11-248225

(51) Int. Cl.$^7$ .................................................. B60J 5/10
(52) U.S. Cl. ...................... 403/270; 403/341; 411/119; 411/121; 296/146.8
(58) Field of Search ............................ 403/270–2, 403, 403/409.1, 285, 408.1, 341, 382, 191, 193, 234; 411/171, 119, 121, 107, 338; 180/89.17, 69.2, 69.21; 296/146.8, 56

(56) References Cited

U.S. PATENT DOCUMENTS 5,782,194 A * 7/1998 Tipton ........................ 114/79
5,876,086 A * 3/1999 Lagrou et al. ......... 296/146.11

FOREIGN PATENT DOCUMENTS

| DE | 24 41 829 A1 | 3/1976 | |
| JP | 58-199218 | * 11/1983 | ............... 296/146.8 |

OTHER PUBLICATIONS

German Office Action, and English translation thereof, dated Feb. 1, 2002.

* cited by examiner

Primary Examiner—Lynne H. Browne
Assistant Examiner—Michael P Ferguson
(74) Attorney, Agent, or Firm—Arent Fox Kintner Plotkin & Kahn, PLLC

(57) ABSTRACT

In a structure for attaching a link for an opening-closing member of the present invention, an end portion of a tail gate open stay 4 disposed between an opening 2 and a tail gate 3 of a vehicle body is supported by a pivotally supporting bolt 5 which is threadedly engaged with a nut 7 provided on a bracket 6 welded to the opening 2 side. The nut is formed into a trapezoidal cross-sectional shape by extrusion forming, the bracket is formed by bending a plate material in such a manner as to wrap three surfaces of the nut on its short base side, and the nut is welded to the bracket.

3 Claims, 4 Drawing Sheets

STRUCTURE FOR ATTACHING LINK FOR OPENING-CLOSING MEMBER

BACKGROUND OF THE INVENTION

1. Field of the Invention

The present invention relates to a structure for attaching a link for an opening-closing member.

2. Description of the Related Art

An arrangement is known in which, in order to allow an opening-closing member such as a tail gate in an automobile, for instance, to be stopped at a fully open position or a semi-open position, a link such as an open stay is provided between the opening-closing member and a vehicle body, i.e., an object to be attached to. There is a type in which a nut is provided on the vehicle body side to effect threaded engagement in attaching the link to the vehicle body.

Conventionally, in a vehicle body in which a body is formed by subjecting a steel plate material to press forming, even if a nut formed of an easily available iron material is used, the nut can be easily fixed by welding to the vehicle body formed of the steel plate.

In recent years, there are cases where vehicle bodies are formed of an aluminum alloy material so as to make the vehicle bodies further lightweight. In such a case,. since the nut cannot be directly welded, it is conceivable to form an aluminum alloy-made plate member in such a manner as to be capable of holding the nut, and to aluminum-weld the aluminum alloy-made plate member to the vehicle body.

However, since the arrangement provided is such that the nut is wrapped in the plate member, the structure lacks in compactness, so that there is a problem in that the interior material appears rising on the vehicle compartment side, and therefore the appearance becomes poor.

SUMMARY OF THE INVENTION

To realize a structure for attaching a link for an opening-closing member which can be made compact by overcoming the above-described problem, in accordance with the present invention, there is provided a structure for attaching a link for an opening-closing member in which a link (4) disposed between an opening (2) and an opening-closing member (3) is threadedly engaged with a nut (7) provided on the opening (2) side, characterized in that the nut (7) is formed by extrusion forming, and a nut supporting member (6) is formed by bending a plate material in such a manner as to partially wrap an external surface of the nut (7), and that the nut (7) is welded to the nut supporting member (6), and the nut supporting member (6) is welded to the opening (2) side.

According to this arrangement, since the nut is formed by extrusion forming, its cross-sectional shape can be designed freely, and the plate-shaped nut supporting member which is formed in such a manner as to wrap the nut can be easily formed. At the same time, the attaching structure including the shape of the nut can be made compact.

In addition, in accordance with the arrangement in which the nut (7) is formed in a trapezoidal cross-sectional shape, and a short base (7b) side of the trapezoid is wrapped in the nut supporting member (6), by attaching the link such that the short base side of trapezoidal cross-sectional shape projects, the external appearance of the projecting portion can be improved, and can be shown in a compact form.

DETAILED DESCRIPTION OF THE PREFERRED EMBODIMENT

Hereafter, a detailed description will be given of an embodiment of the invention on the basis of a specific example shown in the appended drawings.

Figure 1:
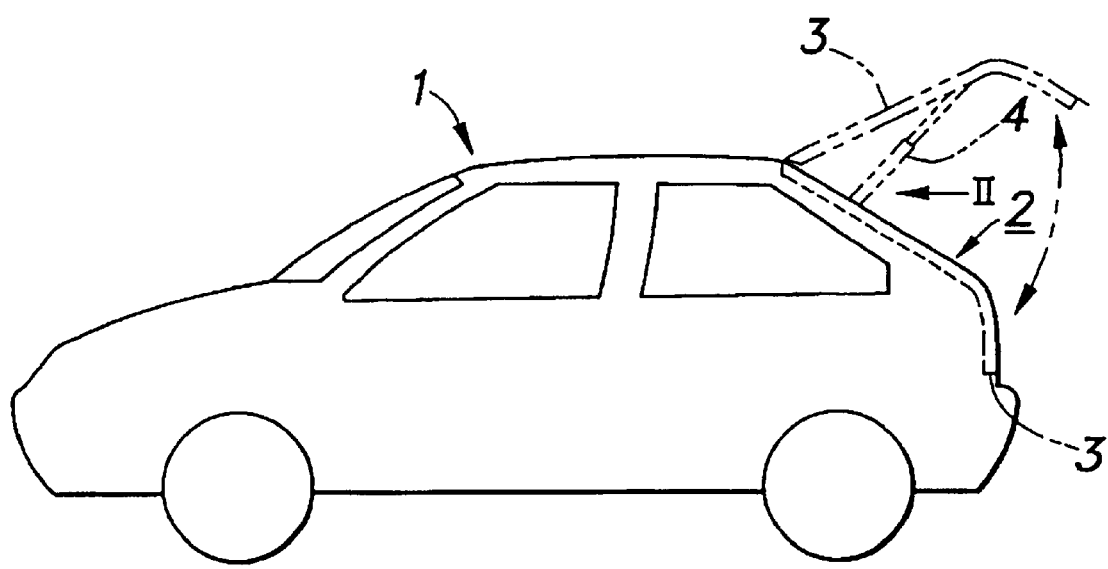
FIG. 1 is a schematic diagram illustrating a side surface of a vehicle to which the invention is applied.

FIG. 1 is a schematic diagram illustrating a side surface of a vehicle to which the invention is applied. In the illustrated vehicle, an opening 2 provided in a rear portion of a vehicle body 1 is made openable by a tail gate 3 serving as an opening-closing member which is pivotally supported on the roof side. A tail gate open stay 4 serving as a link for allowing the tail gate 3 to be stopped at a fully open position or a semi-open position (an arbitrary degree of opening) is disposed between the tail gate 3 and the vehicle body side of the opening 2.

One axial end of the tail gate open stay 4 is rotatably linked to a left or right frame 3a of the tail gate 3, while the other axial end thereof is rotatably linked to a pivotally supporting bolt 5 based on the invention and provided on the vehicle body side of the opening 2. The pivotally supporting bolt 5 is threaded into and secured in a nut 7 secured by welding to a bracket 6 serving as a nut supporting member secured by such as welding to a portion of the frame of the vehicle body 1.

The frame of the vehicle body 1 in the illustrated example is formed by combining aluminum alloy-made extruded materials. In this case, it is difficult to weld and secure a different metallic material (e.g., a steel material) to the frame of the vehicle body 1. Therefore, the aforementioned bracket 6 is formed of an aluminum alloy material and is welded to the vehicle body 1.

Since the load applied to the tail gate open stay 4 acts on the nut 7 through the pivotally supporting bolt 5, it is necessary to support the nut 7 by the bracket 6 with large rigidity. Since sufficient supporting strength can be easily secured by welding the nut 7 and the bracket 6, the nut 7 is also formed of an aluminum alloy material so that the nut 7 can be welded to the bracket 6 formed of an aluminum alloy material.

Since a generally available nut is not made of an aluminum alloy, the aluminum alloy-made nut 7 is newly processed. In this embodiment, the aluminum alloy-made nut 7 is formed by subjecting an aluminum alloy material to extrusion forming into a trapezoidal cross-sectional shape (see FIG. 3), and an internally threaded portion 7a which penetrates in the extruding direction is formed therein.

Figure 2:
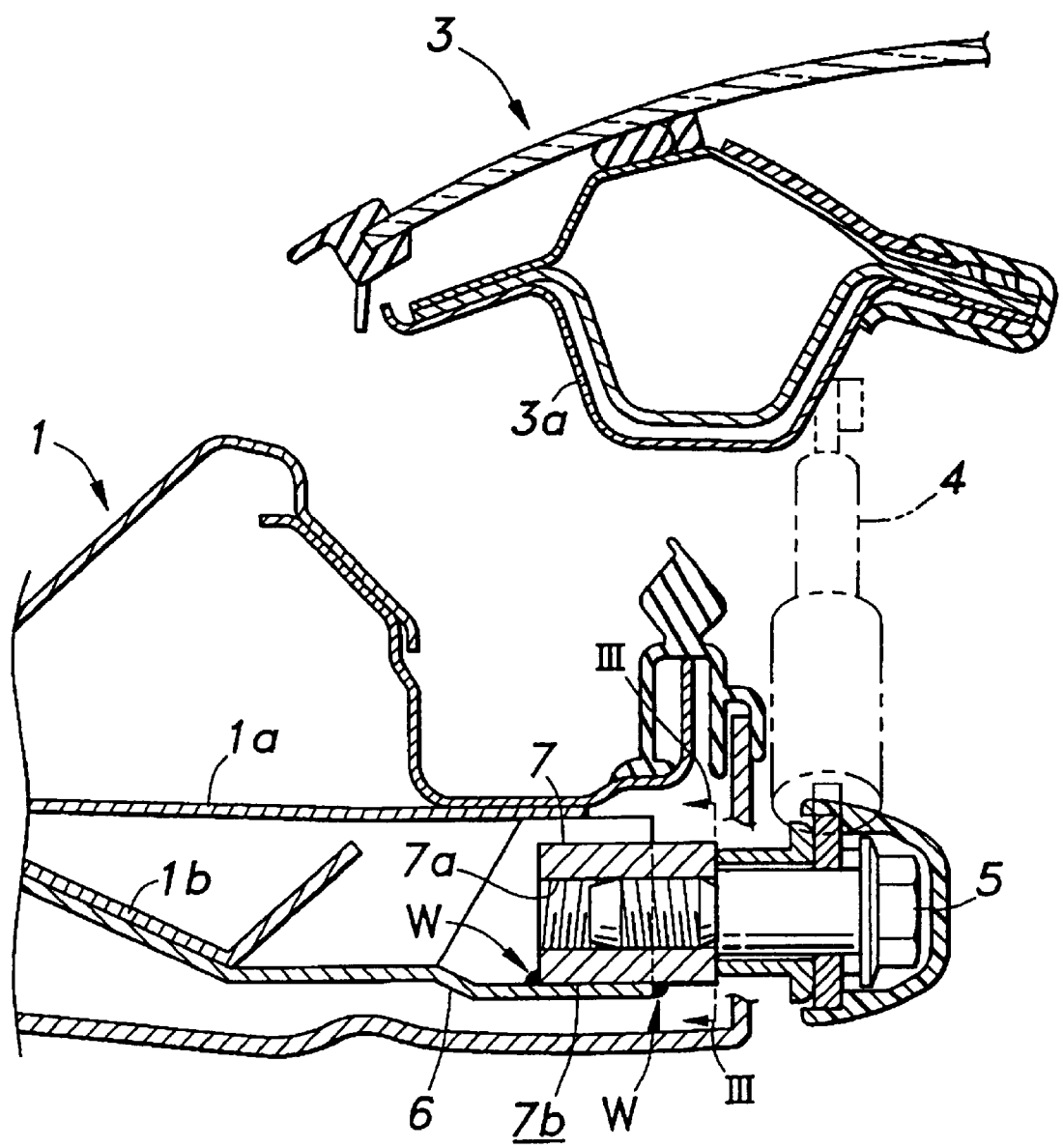
FIG. 2 is an enlarged cross-sectional view, taken from the direction of arrow II in FIG. 1, of essential portions.
Figure 3:
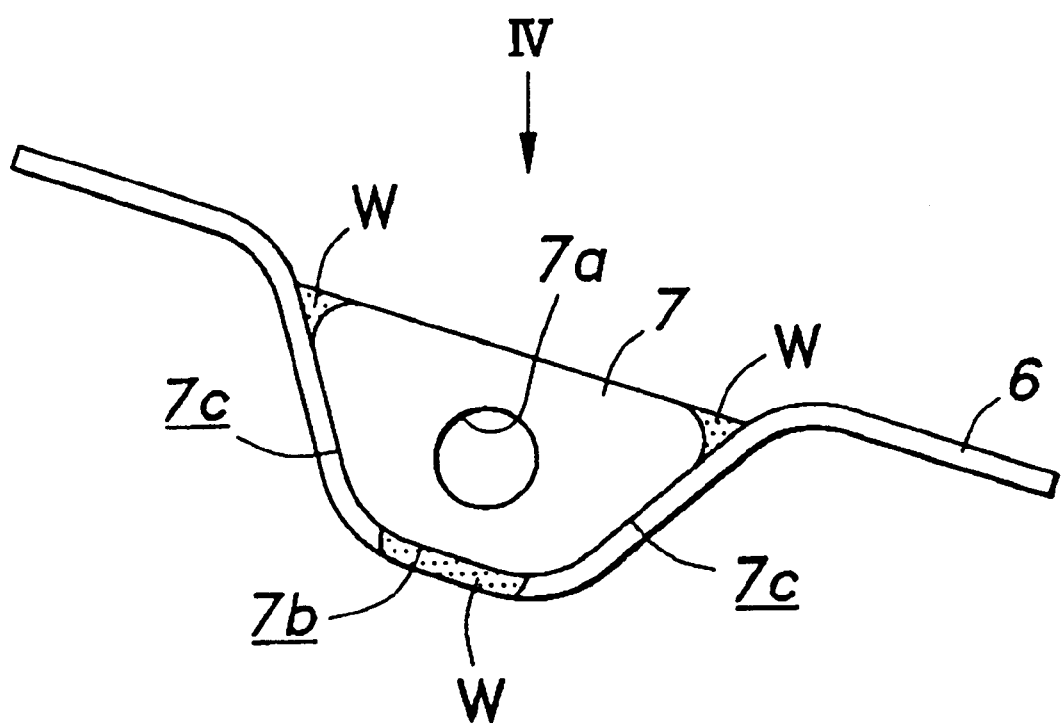
FIG. 3 is an end face view, taken in the direction of arrows along line III—III in FIG. 2, of a nut and a supporting bracket.

Then, as shown in FIG. 3, the bracket 6 is formed by bending a plate-shaped member in such a manner as to wrap three surfaces of the nut 7 in the trapezoidal cross-sectional shape, including a base surface 7b corresponding to the short base (the shorter one of the upper and lower bases) as well as two slanting surfaces 7c located on both sides of that short surface. The nut 7 is secured to the thus-formed bracket 6 by aluminum welding (Win FIGS. 2 and 3) at appropriate portions tangential thereto.

Figure 4:
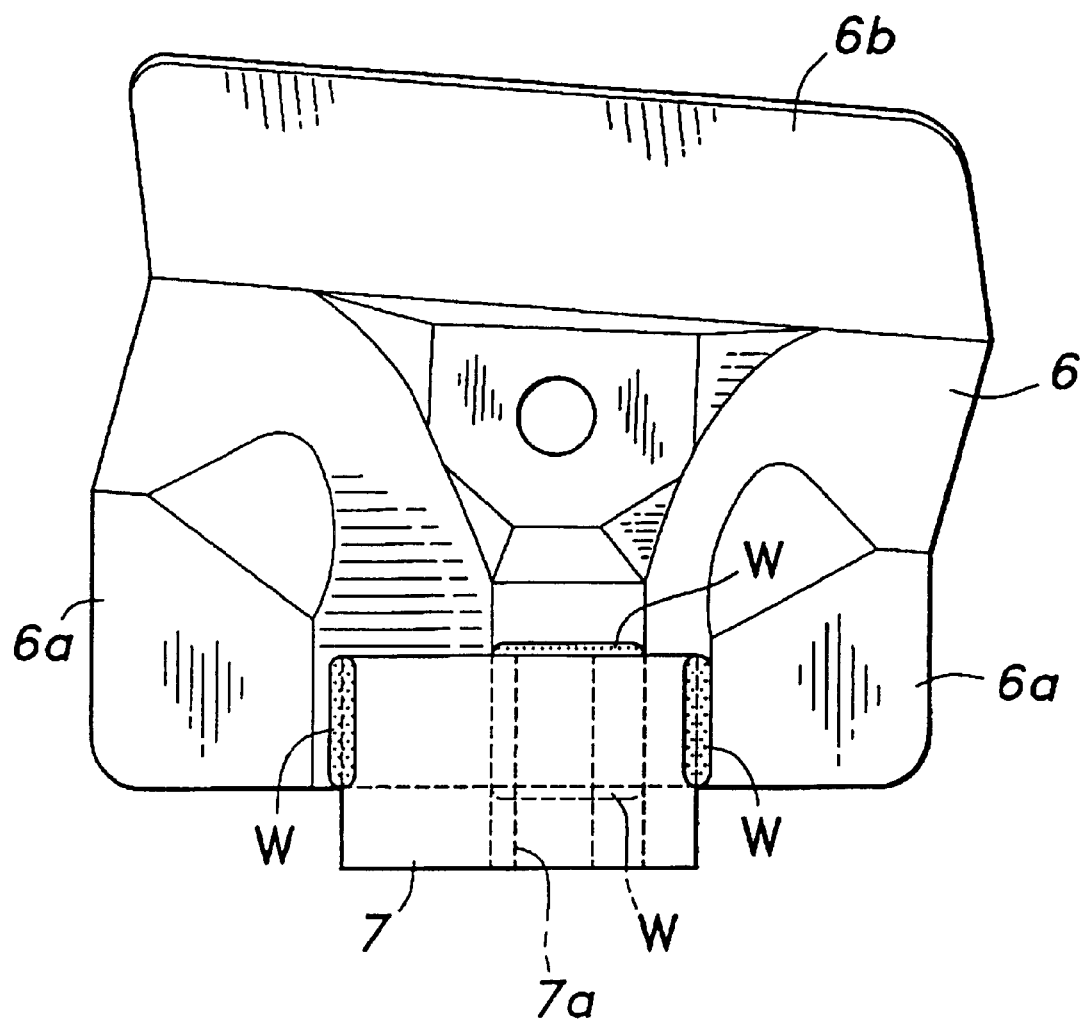
FIG. 4 is a plan view, taken from the direction of arrow IV in FIG. 3, of the nut and the supporting bracket.

In addition, as shown in FIG. 4, formed on the bracket 6 are two collar portions 6a jutting out to the left and the right from the portion bent in such a manner as to wrap the three surfaces of the nut 7, as well as a tongue portion 6b formed in such a manner as to extend in the rearward direction of the nut 7 (in the threadedly advancing direction of the pivotally supporting bolt 5). The two collar portions 6a are welded to a reinforcement 1a making up the opening 2 of the vehicle body 1, and the tongue portion 6b is welded to an inner panel 1b, thereby securing the bracket 6 to the vehicle body 1.

In this embodiment, the aluminum alloy-made bracket 6 capable of being welded to the aluminum alloy-made vehicle body 1 is used, and the nut 7, into which the pivotally supporting bolt 5 for supporting one end portion of the tail gate open stay 4 is threaded, is formed of an aluminum alloy, so that the cross-sectional shape of the nut 7 can be designed freely. Accordingly, since the nut 7 is formed by extrusion forming into a polygonal cross section, the bracket 6 can be formed in such a manner as to wrap the nut 7 while supporting its at least two surfaces.

By forming the cross-sectional shape of the nut 7 in the trapezoidal cross-sectional shape as in the illustrated example, the formation of the bracket 6, when formed by a plate material, can be facilitated. Additionally, since the short base side of the nut 7 is oriented toward the vehicle compartment side, the external appearance of the attaching portion can be shown in a compact form.

It should be noted that the invention is not limited to a tail gate of the illustrated example, and can be applied to a structure for attaching a link which is connected between a door and a vehicle body, and between an opening-closing member and an object to be attached to in various other structures other than an automobile.

As described above, in accordance with the invention, since the nut is welded to the bracket, the support rigidity of the nut can be easily enhanced. In addition, since the cross-sectional shape of the nut which is formed by extrusion forming can be designed freely, by forming the nut into a trapezoidal cross-sectional shape and by forming the supporting bracket by bending a plate material in such a manner as to wrap the short base side of the trapezoidal cross-sectional shape, it is possible to improve the formability of the nut supporting member. In addition, by attaching the link such that the short base side of trapezoidal cross-sectional shape projects, the external appearance of the projecting portion can be improved, and can be shown in a compact form. Since the cross-sectional shape of the nut is a trapezoid, the input load with respect to the nut can be dispersed appropriately.

What is claimed is:

1. A structure for attaching a link for an opening-closing member comprising:

an opening portion;

a link disposed between said opening portion and the opening-closing member;

a nut provided on an opening portion end of said link, said nut adapted to being threadedly engaged to a bolt attached to said link; and a nut supporting member, wherein said nut is formed by extrusion forming and welded to said nut supporting member, wherein said nut supporting member is formed by bending a plate material such that an external surface of said nut is partially wrapped by said nut supporting member and said nut supporting member is welded to said opening portion end of said link, and wherein said nut is formed in a trapezoidal cross-sectional shape, and a short base side of the trapezoid is wrapped in said nut supporting member.

2. The structure for attaching a link for an opening-closing member according to claim 1, wherein said nut is secured to said nut supporting member by aluminum welding at tangential portion between said nut and said nut supporting member.

3. The structure for attaching a link for an opening-closing member according to claim 1, wherein said nut and said nut supporting member are made of an aluminum alloy.

* * * * *